E. A. GEORGE.
BALL AND FLOAT VALVE.
APPLICATION FILED APR. 30, 1920.
1,388,331.
Patented Aug. 23, 1921.
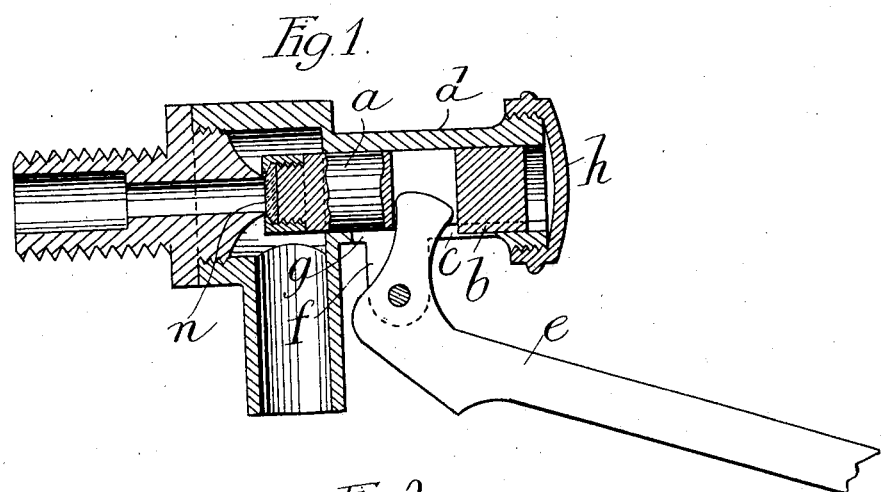
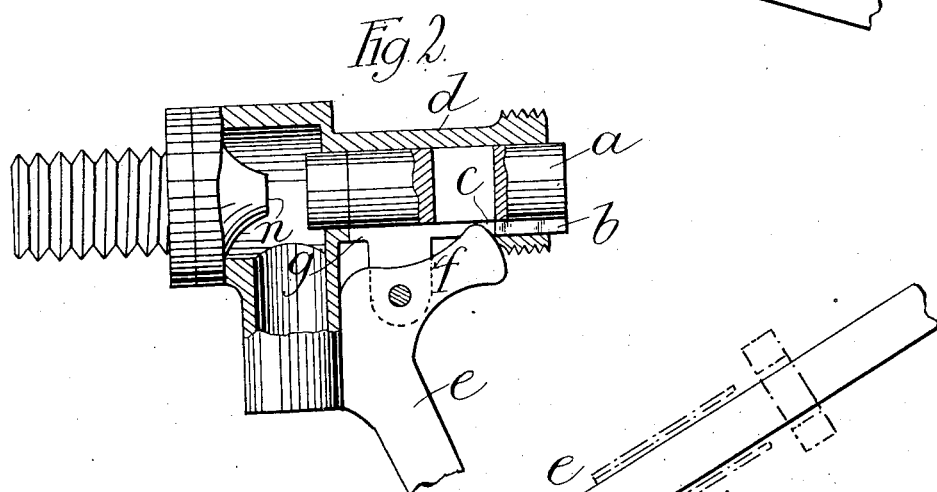
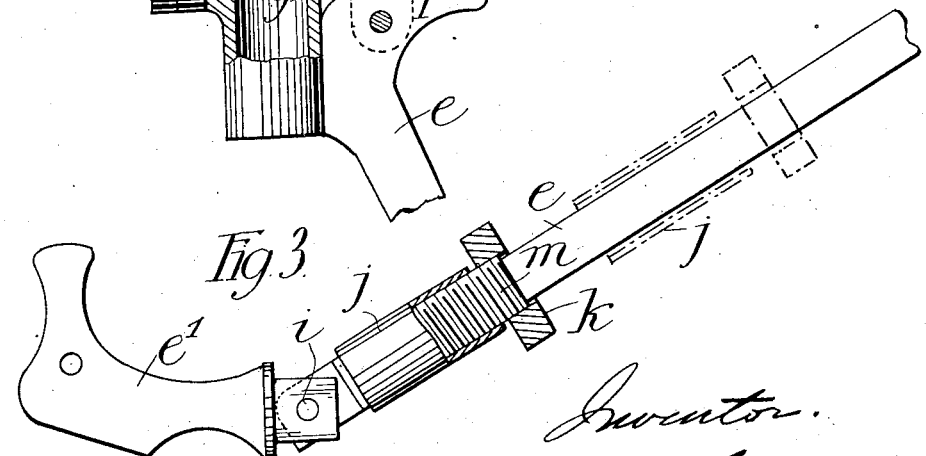

UNITED STATES PATENT OFFICE.

ERNEST ALBERT GEORGE, OF CHELSEA, ENGLAND.

BALL AND FLOAT VALVE.

1,388,331.      Specification of Letters Patent.      Patented Aug. 23, 1921.

Application filed April 30, 1920. Serial No. 377,863.

*To all whom it may concern:*

Be it known that I, ERNEST ALBERT GEORGE, a subject of the King of Great Britain and Ireland, residing at Chelsea, in the county of London, England, have invented Improvements in or Relating to Ball and Float Valves, of which the following is a specification.

This invention relates to that class of valve wherein the angular movement of a lever or arm due to the rising and falling of a ball or float produces reciprocation of a plug member within a casing to establish and interrupt the flow of liquid, and in particular to such valves wherein the plug member is slotted and after insertion longitudinally within the casing is engaged by the lever or arm, the operative connection being completed and maintained by the placing in position of the pivot for the lever or arm.

It has been proposed to arrange for disconnection between the lever and the plug when necessary without removing the pivot from the lever, so that the plug can be quickly replaced, this consisting in so forming and arranging the slot in the plug, the coacting lever arm and the pivot for the latter that whereas the lever has a definite angular movement while in use such as to maintain the connection, this movement can be increased when desired to cause the lever arm to become disengaged from the slot and thus permit the plug to be removed longitudinally. This normal limit of angular movement of the lever is determined by a removable cap against which the plug is adapted to bear.

Such known arrangements are suitable only for deep cisterns where the lever can be lowered into a vertical or approximately vertical position, but where as in shallow cisterns the normal angular movement of the lever is determined by some portion of the cistern or the like engaging the float or lever, such angular movement obviously cannot be increased.

The object of the present invention is therefore to enable the plug to be readily separated from the valve casing in shallow cisterns, to which end means are provided whereby the valve operating lever has normally a definite angular movement for shifting the sliding valve member without disengaging the connection between the lever and said valve member, together with means whereby the angular movement of the lever may be increased to cause the lever to become disengaged from the valve member and thus permit the valve member to be removed from its housing. In one form of the invention the lever is made in two parts one movable in relation to the other when desired so that the increased angular movement can be imparted to the arm in engagement with the slot of the plug.

The invention may be variously carried into effect, as will be obvious from the example illustrated in the accompanying drawings, whereof Figure 1 is a part sectional elevation of a valve in closed position. Fig. 2 is a similar view of the same with the parts in position to enable the valve plug to be removed or replaced.

Fig. 3 is a view of the improved form of lever for use with such a valve.

According to Figs. 1 and 2 the valve plug $a$ is cylindrical in form having a longitudinally arranged rib $b$ adapted to be received by a longer groove $c$ in the companion housing $d$ of the casing so that it acts as a sliding positioning device. The lever $e$ is pivoted between the jaws $f$ beneath the housing $d$ aforesaid as ordinarily, the slot $g$ in the latter through which the lever $e$ works being of such a length that after removal of the screwed end cap $h$ employed to limit the travel of the plug $a$, the lever $e$ can be given an angular movement such as to partially eject the plug $a$ and disengage itself from the latter as shown in Fig. 2. The plug $a$ can then be readily grasped and removed. The replacement of the plug $a$ or its substitute by another can be easily effected by a reversal of the foregoing the keylike means $b$ $c$ described insuring that the plug can only be inserted in the proper way. In cases where ordinarily there may not be room to move the lever arm $e$ sufficiently to disengage it from the plug $a$ the said lever arm may be made in parts movable one in relation to the other so that the requisite angular adjustment of the end associated with the plug can be obtained. For instance as shown in Fig. 3 the lever may comprise two parts $e$, $e'$ hinged together at $i$ and normally rendered rigid by a sleeve $j$ adapted to confine the hinge, the said sleeve being released and retracted to permit the hinge to work. The holding of the sleeve $j$ in position normally may be effected by a nut $k$ working on a screw threaded portion $m$ of the lever part $e$ or other suitable means. The valve seat $n$ forms no part of the present invention and although shown as separate from the housing $d$ may be made in one therewith, other minor details being likewise capable of modification to suit requirements. Neither is any claim made to float levers which are jointed and capable of adjustment for the purpose of determining the level of water at which the valve shall close.

What I claim is:—

1. A ball or float valve comprising a body formed with an open ended housing and with a slot extending through the wall thereof, a sliding valve member in such housing, a valve lever formed in two parts one of which extends through the slot of the housing into engagement with the sliding valve member and is mounted upon a stationary pivot, while the other part is provided with a float, and means for normally connecting the said two parts of the lever together in a rigid manner in which condition a certain predetermined angular movement of the lever cannot be exceeded, such means being adapted to free the connection between the lever parts whereby the angular movement of the part that engages the sliding valve member can be increased to permit it to be disengaged from the valve member.

2. A ball or float valve comprising a body formed with an open ended housing and with a slot extending through the wall thereof, a sliding valve member in such housing, a stationary pivot, a lever part working on said pivot and having an arm adapted to engage the sliding valve member, a second lever part provided at one end with a float and hinged at the other end to the first named lever part, and a sleeve adapted to be advanced along longitudinally in relation to the lever parts when in alinement and to bridge the hinge for the purpose of temporarily rendering the same rigid.

3. A ball or float valve comprising a body formed with an open ended housing and with a slot extending through the wall thereof, a sliding valve member in such housing, a stationary pivot, a lever part working on said pivot and having at one side of the latter an arm adapted to engage the sliding valve member and at the opposite side of the pivot an arm terminating in a hinge component, a second lever part provided at one end with a float and at the opposite end with a screw threaded part and hinge component, a pin coupling the two hinge components, a sleeve adapted to slide over the screw threaded part of the lever and a nut upon the latter adapted to control the movement of such sleeve, substantially as described.

Signed at London, England, this 10th day of April, 1920.

ERNEST ALBERT GEORGE.